United States Patent
Fujima

[11] Patent Number: 5,808,211
[45] Date of Patent: Sep. 15, 1998

[54] ELECTRONIC DEVICE WITH SENSOR

[75] Inventor: Mikako Fujima, Kunitachi, Japan

[73] Assignee: Casio Commputer Co., Ltd., Tokyo, Japan

[21] Appl. No.: 836,933

[22] PCT Filed: Sep. 25, 1996

[86] PCT No.: PCT/JP96/02753

§ 371 Date: May 21, 1997

§ 102(e) Date: May 21, 1997

[87] PCT Pub. No.: WO97/12205

PCT Pub. Date: Apr. 3, 1997

[30] Foreign Application Priority Data

Sep. 28, 1995 [JP] Japan ..................... 7-276275

[51] Int. Cl.$^6$ .......................................... G09G 1/28
[52] U.S. Cl. .................................................. 73/866.3
[58] Field of Search ............................ 368/10, 11, 82, 368/84; 73/866.3, 714; 364/557, 558; 374/141; 345/22, 88, 82, 150; 313/510

[56] References Cited

U.S. PATENT DOCUMENTS

| | | |
|---|---|---|
| 4,687,340 | 8/1987 | Havel . |
| 4,853,681 | 8/1989 | Takashima . |
| 5,592,442 | 1/1997 | Nishikawa et al. .................. 368/11 |

FOREIGN PATENT DOCUMENTS

| | | |
|---|---|---|
| 2 611 521 | 9/1988 | France . |
| 2 667 026 | 3/1992 | France . |
| 31 03 850A | 10/1982 | Germany . |
| 2 023 311 | 12/1979 | United Kingdom . |

*Primary Examiner*—Robert Raevis
*Attorney, Agent, or Firm*—Frishauf, Holtz, Goodman, Langer & Chick

[57] ABSTRACT

An electronic device with a sensor displays in colors, in accordance with values measured by the sensor, information associated with the values. When a temperature measurement mode is selected, a control unit (11) causes a temperature sensor (21) and a measuring circuit (20) to detect a temperature of snow, and writes data of the detected temperature of snow in a temperature data register (C) of a display register (40) of a RAM (12). The control unit (11) also reads display color data, corresponding to a company name of a ski wax maker stored in a company name register (N) of the RAM (12) and a value of the temperature data register (C) of the display register (40), from a color conversion table of a ROM (13) which stores display color data representing index colors of ski wax of the respective ski wax makers. The control unit (11) causes a display unit (15) to display the company name stored in the company name register (N) and the data of detected temperature of snow stored in the temperature data register (C) in the color corresponding to the display color data stored in the display color register (L) of the display register (40).

16 Claims, 7 Drawing Sheets

COLOR CONVERSION TABLE

| TEMPERATURE °C | COMPANY A (N = 0) | COMPANY B (N = 1) | COMPANY C (N = 2) |
|---|---|---|---|
| 0 | 3, 6 | 4, 6 | 4, 6 |
| -1 | 3, 6 | 4, 6 | 4, 6 |
| -2 | 3, 6 | 4, 6 | 4, 6 |
| -3 | 3, 6 | 4, 6 | 4, 2 |
| -4 | 3, 6 | 4, 6 | 4, 2 |
| -5 | 3, 2 | 4, 6 | 2, 6 |
| -6 | 2, 6 | 4, 6 | 2, 6 |
| -7 | 2, 6 | 4, 6 | 2, 6 |
| -8 | 2, 1 | 4, 2 | 2, 5 |
| -9 | 2, 1 | 2, 6 | 2, 5 |
| -10 | 2, 1 | 2, 6 | 5, 6 |
| -11 | 1, 6 | 2, 6 | 5, 6 |
| ⋮ | | | |
| -16 | 1, 6 | 2, 6 | 5, 6 |

ELECTRONIC DEVICE WITH SENSOR

TECHNICAL FIELD

The present invention relates to an electronic device with a sensor, and more particicularly to an electronic device which displays information corresponding to a value measured by the sensor.

BACKGROUND ART

Conventionally, an electronic device is known which includes a pressure sensor or temperature sensor and displays a value measured by the sensor. For example, an altimeter or sounding machine displays an altitude or depth of water based on pressure data measured by a pressure sensor. An electronic thermometer or clinical thermometer displays on a display unit atmospheric temperature data or body temperature data measured by a temperature sensor incorporated therein.

The conventional electronic device with a sensor, as described above, displays only a value measured by the sensor, and. cannot display other information based on the measured value.

DISCLOSURE OF THE INVENTION

The present invention has been made to solve the aforementioned drawback of the conventional device, and its object is to provide an electronic device with a sensor which can display not only a value measured by the sensor but also information based on the measured value.

To achieve the above object, according to the present invention, there is provided an electronic device comprising a sensor; a sensor driving circuit for driving the sensor, thereby obtaining data of measurement values; a display capable of performing color display; a storage unit for storing data of display colors respectively corresponding to the data of the measurement values obtained by the sensor driving circuit; a reader for reading data of a display color corresponding to data of a measurement value obtained by the sensor driving circuit from the data of display colors stored in the storage unit; and a display controller for driving the display to perform display in a color corresponding to the data of the display color read by the reader.

With the above structure, the electronic device with a sensor of the present invention can display information corresponding to values measured by the sensor in colors associated with the values. Thus, since information other than the measured value can be displayed, and the utility of the device is increased.

BEST MODE OF CARRYING OUT THE INVENTION

A preferred embodiment of the present invention will be described with reference to the accompanying drawings.

Figure 1:
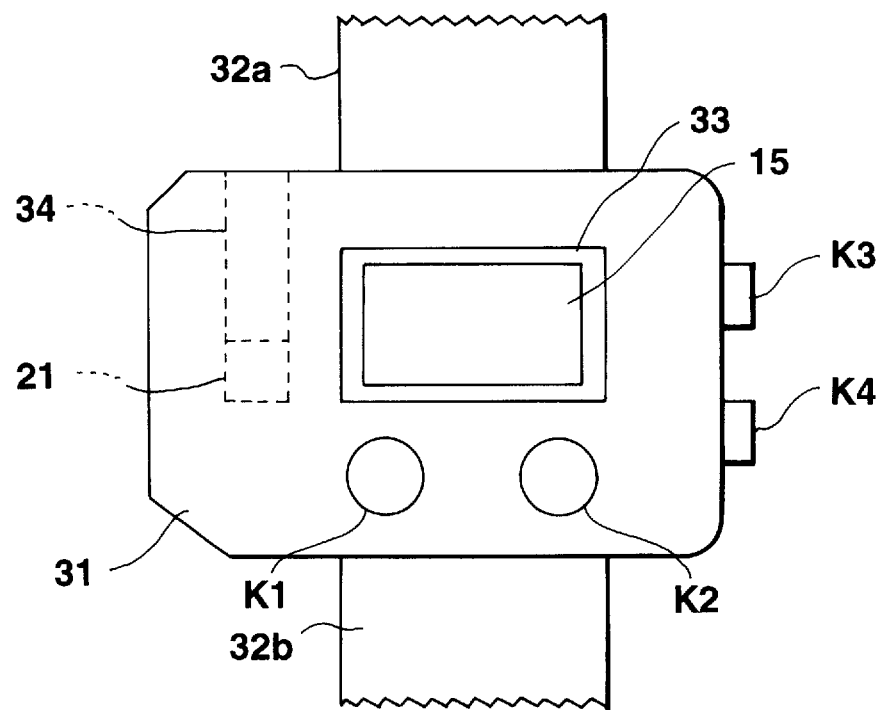
FIG. 1 is a front view of an electronic watch according to an embodiment of an electronic device with a sensor of the present invention.

FIG. 1 is a front view of an electronic watch to which the present invention is applied.

As shown in FIG. 1, watch bands 32a and 32b are attached to upper and lower sides of a watch case 31. A display 15 is arranged in a central portion of the watch case 31 under a glass 33. A mode change switch K1 and a temperature measurement switch K2 are arranged in a lower portion of the surface of the watch case 31. A maker set switch K3 and a time adjustment switch K4 are arranged on a right side of the watch case 31. A detection groove 34 is formed in an upper left portion of the watch case 31 and a temperature sensor 21 of a radiation thermometer is arranged in an inner portion of the detection groove 34.

Figure 2:
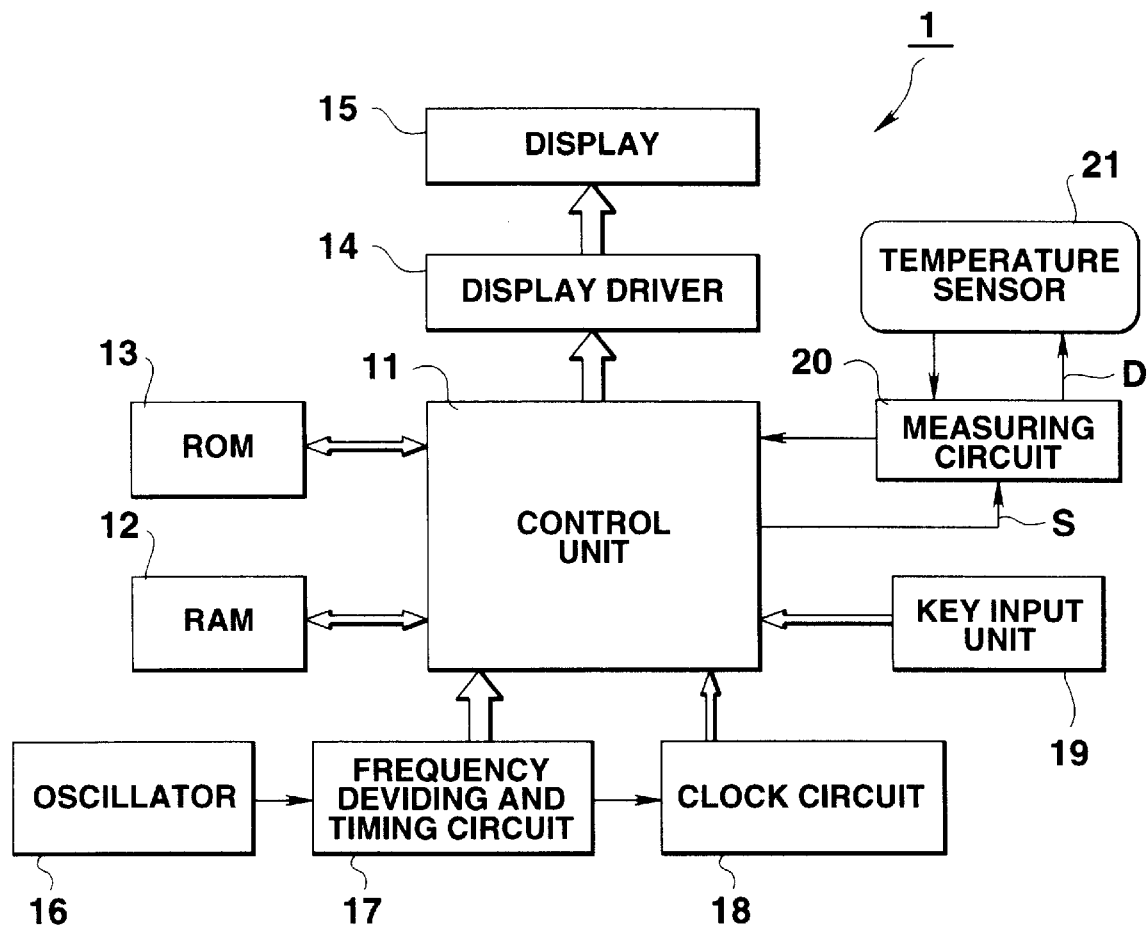
FIG. 2 is a block diagram showing circuits of the electronic watch shown in FIG. 1.

FIG. 2 shows a circuit structure of the electronic watch as described above.

Referring to FIG. 2, the electronic watch comprises a control unit 11, a RAM 12, a ROM 13, a display driver 14, a display 15, an oscillator 16, a frequency-dividing and timing circuit 17, a clock circuit 18, a key input unit 19, a measuring circuit 20 and a temperature sensor 21.

The key input unit 19 includes the mode change switch K1, the temperature measurement switch K2, the maker set switch K3 and the time adjustment switch K4, for setting various modes of the electronic watch and processes in the modes.

The oscillator 16, which is made up of, for example, a quartz oscillator, outputs an oscillating frequency signal of a predetermined period to the frequency-dividing and timing circuit 17.

The frequency-dividing and timing circuit 17 frequency-divides the oscillating frequency signal supplied from the oscillator 16. It supplies a system clock signal for controlling the overall circuits and various timing signals to the control unit 11. It also supplies a clock signal to the clock circuit 18.

The clock circuit 18 clocks time based on clocks supplied from the frequency-dividing and timing circuit 17. It generates time data representing the current time, consisting of the year, month, date, hour, minute and second, and supplies it to the control unit 11.

The display driver 14 is operated under control of the control unit 11, and causes the display to display the time data transferred from the clock circuit 18 or the display data transferred from a display register 40 of the RAM 12.

The display 15 is comprised of, for example, a reflection type liquid crystal color display panel, and displays the time data or display data transferred from the register 40 of the RAM 12.

The temperature sensor 21 is, for example, an infrared detection type sensor. It operates in response to a drive signal D supplied from the measuring circuit 20, detects the amount of infrared rays emitted from an object to be measured, and outputs a voltage signal corresponding to the amount to the measuring circuit 20.

The measuring circuit 20, which is driven in reply to an operation signal S supplied from the control unit 11, outputs the aforementioned drive signal D. In addition, based on the voltage signal supplied from the temperature sensor 21, the measuring circuit 20 calculates temperature data by means of a voltage-temperature conversion table stored in a ROM (not shown) or a calculator, and supplies the obtained temperature data to the control unit 11. The temperature data is written in a temperature data register T of the display register 40 of the RAM 12 (to be described later) by the control unit 11.

Figures 3, 4:
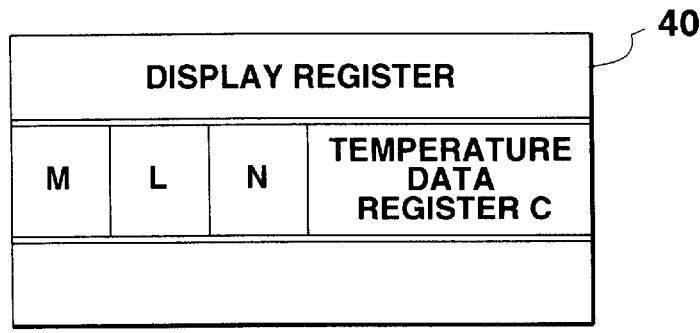
FIG. 3 is a diagram showing a structure of the RAM shown in FIG. 2.
FIG. 4 is a diagram showing a color conversion table stored in the ROM shown in FIG. 2.

FIG. 3 shows memory areas of the RAM 12. The RAM 12, including the display register 40, is used as a work memory of the control unit 11. The display register 40 stores data to be displayed on the display 15. The RAM 12 also includes a mode flag register area M, a display color register area L, a company name register area N, a temperature data register area C, and so on.

The mode flag register M stores mode data representing a display mode. When the value stored in the mode flag register M is "0" (hereinafter represented like M="0"), a time display mode is selected and the display 15 displays the current time. When M="1", a temperature measurement mode is selected and the display 15 displays the name of the ski wax manufacturing company and the temperature of snow in an index color of ski wax corresponding to the measured temperature of snow.

The display color register area L stores one or two pieces of display color data read from a color conversion table in the ROM 13. The display 15 displays a color corresponding to the display color data stored in the display color register.

The company name register N stores the name of a manufacturing company of a color wax for skies. For example, N="0", "1" and "2" denote the company names, "Company A", "Company B" and "Company C", respectively.

The temperature data register area C stores temperature data representing the temperature of snow detected by the temperature sensor 21 and the measuring circuit 20.

The ROM 13 stores various programs and data, and the color conversion table as shown in FIG. 4.

The color conversion table shown in FIG. 4 stores snow temperatures and index colors (the colors of the boxes of the ski wax) of ski wax of the respective ski wax manufacturing companies, suitable for the respective temperatures. Two of the display color data "1" to "6" are indicated for each company and temperature.

The display color data "0" to "5" respectively denote the colors "black", "blue", "red", "orange", "yellow" and "green" (although "0" is not indicated in the table of FIG. 4, the current time is displayed with the color (black) corresponding to the data "0"). The display data "6" represents that no data is stored. The display data of the color conversion table are read by the control unit 11.

For example, in the display register 40, when the mode flag register stores M="1" (representing the temperature measurement mode), the company name register stores N="0" (Company A), and the temperature data register stores C="−6", the corresponding display color data "2" is read from the color conversion table and written in the display color register L. In the same manner, when the temperature data register area stores "−5", the display color data "3" and "2" are read from the table and written in the display color register L.

Figure 6:
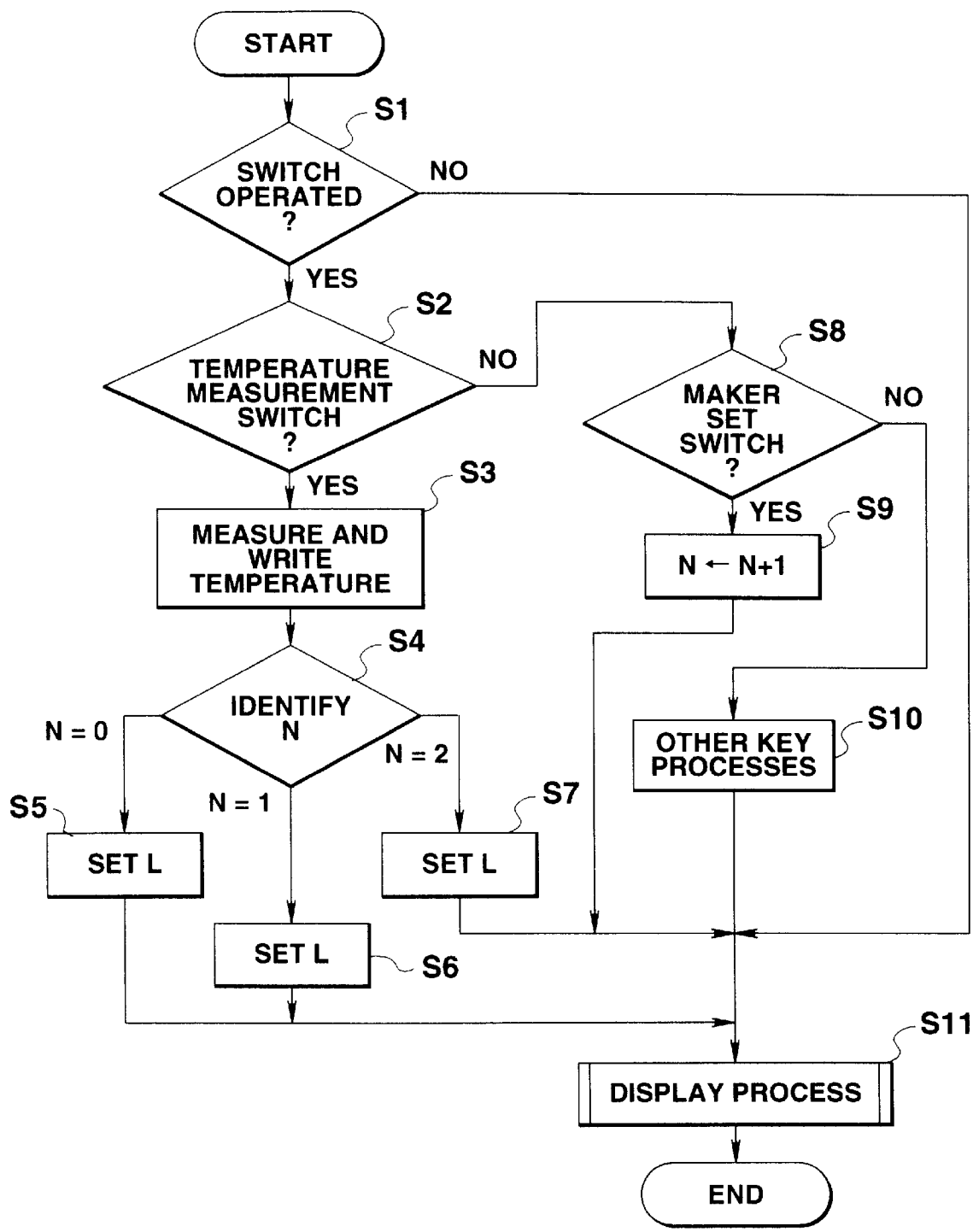
FIG. 6 is a flowchart for explaining processes executed by the control unit.
Figure 7:
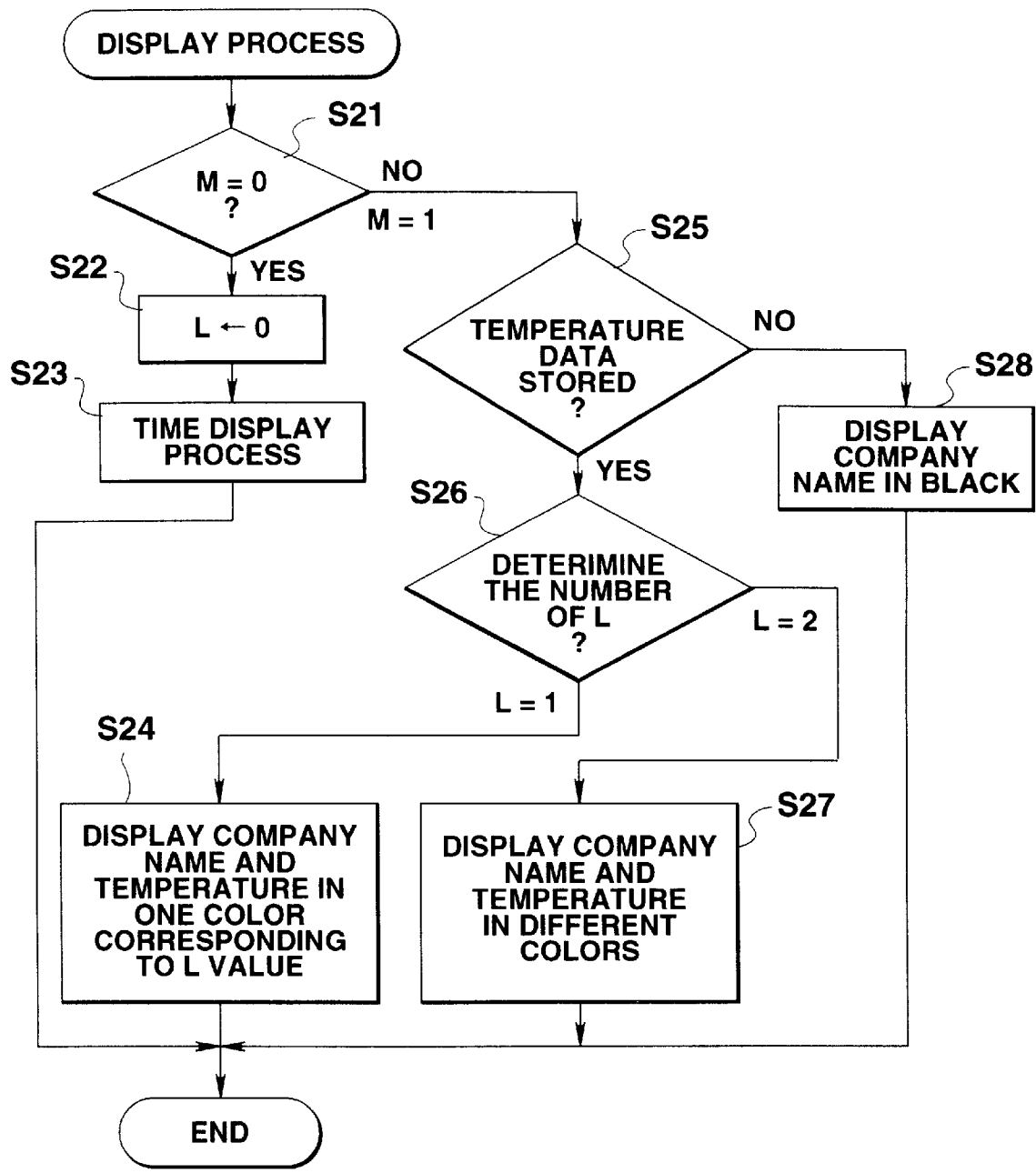
FIG. 7 is a flowchart for explaining a display process executed by the control unit.

The control unit 11, comprised of a CPU (central processing unit), executes processes shown in the flowcharts of FIGS. 6 and 7 in accordance with microprograms stored in the ROM 13. Although operations represented by the flowcharts will be described in detail later, an outline thereof will be first described.

First, when the temperature measurement switch K2 of the key input unit 19 is depressed to select the temperature measurement mode, the control unit 11 causes the temperature sensor 21 and the measuring circuit 20 to measure the temperature of snow, and causes the temperature data register C of the RAM 12 to store the obtained temperature data. Then, the control unit 11 discriminates the value of the company name register N of the RAM 12, and reads, from the color conversion table of the ROM 13, display color data corresponding to the temperature data stored in the temperature data register C and the company name stored in the company name register N. The control unit 11 writes the display color data read from the table into the display color register L.

For example, when the mode flag register M of the display register 40 stores data M="1" (the temperature measurement mode), the company name register N stores data N="0" (the company A) and the temperature data register C stores data C="−6", the control unit 11 reads the display color data "2" from the color conversion table of the ROM 13, and writes it into the display color register L of the RAM 12.

Further, when the control unit 11 identifies the value of the mode flag register M of the RAM 12 as M=0, i.e., the time display mode, it writes the display color data "0" representing the color "black" into the display color register L of the display register 40, and causes the display 15 to display in black the current time data, consisting of the year, month, hour, minute, second and so on, obtained from the clock circuit 18.

On the other hand, when the control unit 11 identifies the value of the mode flag register M of the RAM as M=1, i.e., the temperature measurement mode, it causes the display 15 to display, in the color corresponding to the value stored in the display color register L, the temperature corresponding to the value stored in the temperature data register T and the company name corresponding to the value stored in the company name register N.

For example, when the mode flag register M stores data M="1" (the temperature measurement mode), the company name register N stores data N="0" (the company A), the temperature data register C stores data C="−6", and the display color register L stores the data L="2", the control unit 11 causes the display 15 to display "Company A" and "−6° C." in red.

Figure 5:
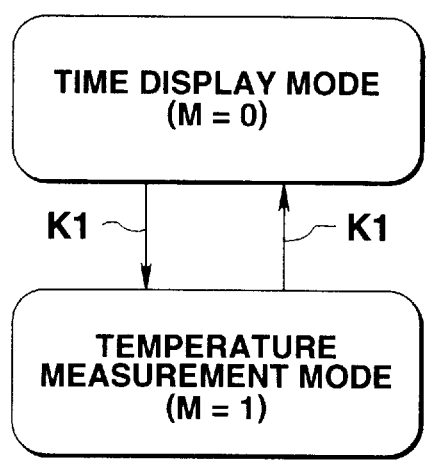
FIG. 5 is a diagram for explaining switching operations executed by a control unit.

FIG. 5 shows a state in which the value in the mode flag register M of the RAM 12 is renewed by operating the mode change switch K1, thereby changing the mode. When the value of the mode flag register M is 0 (M="0"), the time display mode is selected and the display 15 displays current time data including the year, month, date, hour, minute, second and so on.

In the time display mode, when the mode change switch K1 is operated, the value of the mode flag register M is incremented by "1" (M="1"), so that the mode is switched to the temperature measurement mode. The display in the temperature measurement mode has already been described above. In the temperature measurement mode, when the mode change switch K1 is operated, the value of the mode flag register M is decremented by "1" (M="0"), so that the mode is switched to the time display mode.

The above operation will be now described with reference to the flowcharts of FIGS. 6 and 7.

Referring to FIG. 6, first, the control unit 11 determines whether a switch (e.g., the switch keys K1 to K4 of the key input unit 19) is operated (Step S1). When it is determined that a switch is operated, it is further determined whether the operated switch is the temperature measurement switch K2 for measuring a temperature (Step S2). On the other hand, when it is determined in Step S1 that no switch is operated, the flow advances to a display process in Step S11.

When it is determined in Step S2 that the temperature measurement switch K2 is depressed, the control unit 11 causes the temperature sensor 21 and the measuring circuit 20 to measure the temperature of snow, writes the measured temperature data into the temperature data register C of the RAM 12 (Step S3). Further, the control unit 11 identifies the value stored in the company name register N (Step S4), reads from the color conversion table of the ROM 13 display color data corresponding to the ski wax index color based on the temperature data stored in the temperature data register T in accordance with the value of the company name register N, and writes the display color data into the display color register L (Steps S5 to S7). More specifically, the control unit 11 discriminates the value of the company name register N from "0", "1" and "2", reads the value of the temperature data register T from the color conversion table of the ROM 13, and writes the read data into the display color register L. Then, the flow advances to Step S11 to execute a display process.

For example, when the company name register N stores "0" which represents Company A, the flow advances to Step S5. If the temperature data register C stores the value "–8", the display color data "2" and "1" are read from the color conversion table in the ROM 13, and written in the display color register L of the display register 40. Then, the flow advances to Step S11.

When it is determined in Step S2 that the temperature measurement switch K2 is not depressed, it is determined whether the maker set switch K3 is depressed (Step S8). If the maker set switch K3 is depressed, the value of the company name register N is incremented by "1" and the flow advances to Step S11. If the maker set switch K3 is not depressed, the flow advances to Step S10 for executing the other key processes, for example, the mode change process when the mode change switch K1 is depressed, and the time set or adjustment process when the time adjustment switch key K4 is depressed (Step S10). Then, the flow advances to Step S11 for executing a display process as shown in the flowchart of FIG. 7, that is, the display mode process is completed.

The display process of Step 11 shown in FIG. 6 will now be described with reference to the flowchart shown in FIG. 7.

Referring to FIG. 7, first, the control unit 11 determines whether the value of the mode flag register M of the display register 40 of the RAM 12 is "0" or "1" (Step S21). If the value is determined to be "0" (the time display mode), the control unit 11 writes the display color data "0" representing "black" into the display color register L (Step S22), and causes the display 15 to display, in black, time data including the current year, month, date, hour, minute, second and so on obtained by the clock circuit 18. Then, the display process is completed.

In Step S21, if the control unit 11 determines that the value of the mode flag register M is "1" (the temperature measurement mode), the flow advances to Step S25, in which it is determined whether temperature data is stored in the temperature data register C. If temperature data is not stored, the control unit causes the display 15 to display in black only the company name corresponding to the value of the company name register N (Step S28). On the other hand, if the control unit 11 determines that temperature data is stored in the temperature data register C, it determines the number of pieces of display color data stored in the display color register L (Step S26). If the number of pieces of the display color data is determined to be 1, the control unit 11 causes the display 15 to display the company name and the temperature in the one color corresponding to the display color data (Step S24). Then, the display process is completed.

For example, if the value of the display color register L is "2" representing "red", the value of the company name register N is "0" representing "Company A" and the value of the temperature data register C is "–6", the display 15 displays "Company A/–6° C." in red.

In Step S26, if the number of pieces of the display color data is determined to be 2, the control unit 11 causes the display 15 to display the company name and the temperature in different colors (Step S27). Then, the display process is completed. For example, if the values of the display color register L are "2" and "1" representing "red" and "blue", the value of the company name register N is "0" representing "Company A" and the value of the temperature data register C is "–9", the display 15 displays "Company A" in red and "–9° C." in blue. Then, the display process is completed.

As described above, according to the above embodiment, since the index color of hot ski wax, corresponding to the temperature obtained by the measurement of snow temperature, is color-displayed on the display unit, the user can select suitable hot ski wax easily and reliably.

Further, in the above embodiment, since a reflection type liquid crystal color display panel is used in the display unit, high-quality color display can be obtained with a simple structure at a low cost.

The above embodiment is constructed so as to select the most suitable hot ski wax based on the result of snow temperature measurement; however, it is possible to use a snow temperature and an atmospheric temperature as indexes to select hot ski wax.

Further, although a reflection type liquid crystal color display panel is used in the display 15 in the above embodiment, the present invention is not limited to this embodiment, and a display of any type can be used, so long as it can perform multicolor display. For example, it is possible to perform multicolor display by means of EL (electro-luminescence) elements.

Furthermore, in the above embodiment, the display unit of an electronic watch displays the company name of hot ski wax and the snow temperature in an index color of the hot ski wax corresponding to the snow temperature obtained by the measurement. However, the present invention is not limited to this embodiment. Desirable information or detection value, other than a ski wax company name or a snow temperature, may be displayed in colors having some relation to measurement values or detection values based on the measurement or detection of the sensor.

Figure 8:
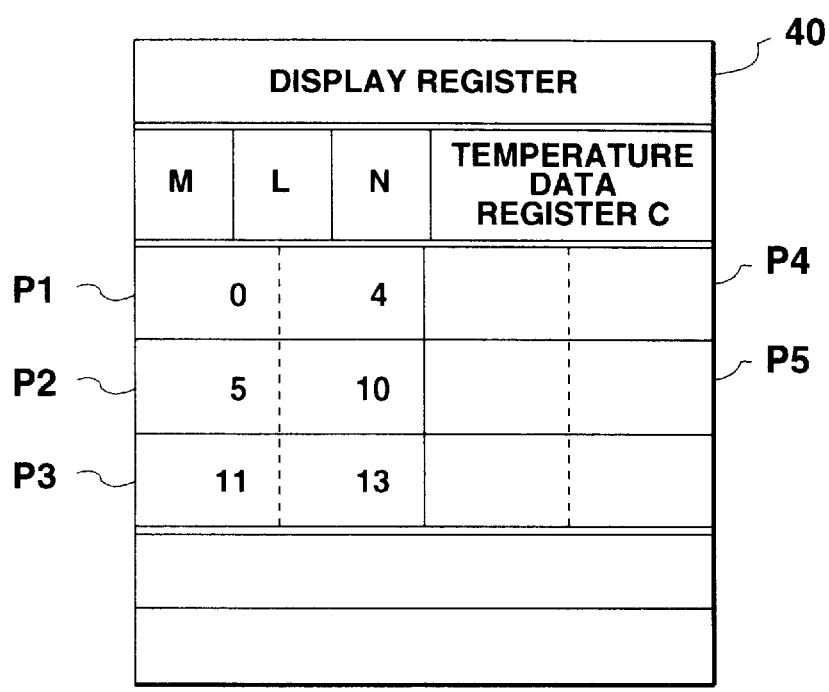
FIG. 8 is a diagram showing another structure of the RAM shown in FIG. 2.

FIG. 8 shows a RAM 40 in a thermometer for measuring an atmospheric temperature. The RAM 40 is incorporated in an electronic device having the same structure as that shown in FIG. 2 except for the RAM 40.

Referring to FIG. 8, the user can set desirable temperature data into registers P1 to P5 through the key input unit 19 (FIG. 2). Temperature data measured by the temperature sensor 21 is stored in the temperature data register C. If the stored data is within the range of the value stored in the register P1, display color data "1" is stored in the register L, and if the stored data is within the range of the value stored in the register P2, display color data "2" is stored in the register L.

With the above RAM, when the atmospheric temperature is 0° C. to 4° C., the display color is blue; when it is 5° C. to 10° C., the display color is red; and when it is 11° C. to 13° C., the display color is orange. If a lower temperature is displayed in whiter or more bluish color and a higher temperature is displayed in more reddish color, it is possible to indicate the degree of the temperature by the display color.

In the above embodiment, the display unit performs multicolor display in accordance with the temperature. However, the present invention is not limited to this embodiment. The sensor need not be a temperature sensor, so long as any information related to values measured by the temperature are displayed in different colors.

For example, assuming that the electronic device of the present invention comprises a pressure sensor for measuring a depth of water, it is possible to set the device as follows. If the information that the user is a beginner diver is set to the device, the depth of water is displayed in black in a relatively shallow region of a depth less than 10 m, and in red in a region deeper than 10 m, so that the user can be informed that it is dangerous to dive deeper. If the information that the user is a middle class diver is set to the device, the display color is switched between black and red at the depth of 30 m. If the information that the user is an expert is set to the device, the display color is switched between black and red at the depth of 50 m.

Further, in the above embodiment, the company name data and the measured temperature data themselves are displayed in colors. However, the colors of the background of the display may be changed, while the colors of data remain unchanged.

As has been described above, with the electronic device with a sensor of the present invention, information corresponding to values measured by the sensor are displayed in different colors associated with the values. Thus, the operability of the device is increased. For example, if the sensor is to measure snow temperature as in the above embodiment, an index color of hot wax corresponding to the temperature is color-displayed in accordance with the result of the measurement. Therefore, the user can select ski wax easily and reliably.

I claim:

1. An electronic device comprising:
  a sensor;
  a sensor driving circuit for driving the sensor to obtain a plurality of measurement value data;
  a display capable of performing color display;
  a plurality of storing means for storing data of display colors respectively corresponding to the plurality of measurement value data obtained by the sensor driving circuit;
  switch means for selectively designating one of said plurality of storing means;
  is reading means for reading data of the display color corresponding to the measurement value data obtained by the sensor driving circuit which is stored in the designated one of said plurality of storing means; and
  display control means for driving the display to perform display in a color corresponding to the data of the display color read by the reading means.

2. The electronic device according to claim 1, wherein the sensor comprises a temperature sensor for measuring a temperature.

3. The electronic device according to claim 1, wherein the sensor comprises a pressure sensor for measuring a pressure.

4. The electronic device according to claim 1, wherein the display comprises a liquid crystal color display.

5. The electronic device according to claim 1, wherein the storing means stores data of a plurality of display colors respectively corresponding to the plurality of measurement value data, and the display control means drives the display to perform display in the plurality of display colors.

6. The electronic device according to claim 1, further comprising an operation switch for operating the sensor driving circuit.

7. The electronic device according to claim 1, further comprising a clock for measuring a current time, and wherein said display control means controls the display to display the current time.

8. The electronic device according to claim 1, wherein the display includes a display area for displaying the measurement value data obtained by the sensor driving circuit in the display colors.

9. The electronic device according to claim 1, further comprising an operation switch for setting and storing the data of the display colors in the plurality of storing means.

10. An electronic device comprising:
  a temperature sensor for detecting a temperature of snow;
  a display capable of performing color display;
  first storing means storing data of display colors representing index colors of ski wax of ski wax makers;
  second storing means for storing a ski wax maker selected by an operator;
  reading means for reading, from the first storing means, data of a display color corresponding to the temperature of snow obtained by the temperature sensor and data of a display color corresponding to the ski wax maker stored in the second storing means; and
  display control means for causing the display to display the temperature of snow detected by the temperature sensor in the display color read by the reading means.

11. The electronic device according to claim 10, wherein the display comprises a liquid crystal color display.

12. The electronic device according to claim 10, wherein the first storing means comprises means for storing data of a plurality of display colors respectively corresponding to temperatures of snow, and the display control means causes the display to perform display in the plurality of display colors.

13. The electronic device according to claim 10, further comprising an operation switch for operating the temperature sensor.

14. The electronic device according to claim 10, further comprising a clock for measuring a current time, and wherein said display control means causes the display to display the current time.

15. The electronic device according to claim 10, wherein the temperature sensor comprises a radiation type temperature sensor.

16. The electronic device according to claim 10, further comprising an operation switch for setting and storing the data of the display colors in the first storing means.

* * * * *

UNITED STATES PATENT AND TRADEMARK OFFICE
CERTIFICATE OF CORRECTION

PATENT NO. : 5,808,211
DATED : September 15, 1998
INVENTOR(S) : FUJIMA, Mikako

It is certified that error appears in the above-identified patent and that said Letters Patent is hereby corrected as shown below:

Column 7, line 60, before "reading means", delete "is".

Signed and Sealed this

Eighth Day of June, 1999

Attest:

Q. TODD DICKINSON

*Attesting Officer*    Acting Commissioner of Patents and Trademarks